(12) United States Patent
Schirtzinger et al.

(10) Patent No.: US 11,072,026 B2
(45) Date of Patent: Jul. 27, 2021

(54) SYSTEMS AND PROCESSES FOR DISTRIBUTING MATERIAL DURING ADDITIVE MANUFACTURING

(71) Applicant: United Technologies Corporation, Farmington, CT (US)

(72) Inventors: Gary A. Schirtzinger, Glastonbury, CT (US); Sergey Mironets, Charlotte, NC (US)

(73) Assignee: Raytheon Technologies Corporation, Farmington, CT (US)

( * ) Notice: Subject to any disclaimer, the term of this patent is extended or adjusted under 35 U.S.C. 154(b) by 1115 days.

(21) Appl. No.: 15/105,394

(22) PCT Filed: Jan. 13, 2015

(86) PCT No.: PCT/US2015/011145
§ 371 (c)(1),
(2) Date: Jun. 16, 2016

(87) PCT Pub. No.: WO2015/108849
PCT Pub. Date: Jul. 23, 2015

(65) Prior Publication Data
US 2016/0311023 A1    Oct. 27, 2016

Related U.S. Application Data

(60) Provisional application No. 61/927,286, filed on Jan. 14, 2014.

(51) Int. Cl.
*B22F 12/00* (2021.01)
*B28B 1/00* (2006.01)
*B28B 13/02* (2006.01)
*B33Y 10/00* (2015.01)
*B33Y 30/00* (2015.01)
(Continued)

(52) U.S. Cl.
CPC ............... *B22F 12/00* (2021.01); *B22F 3/16* (2013.01); *B22F 5/04* (2013.01); *B28B 1/001* (2013.01);
(Continued)

(58) Field of Classification Search
CPC .. B22F 3/1055; B22F 3/16; B22F 5/04; B22F 2003/1056; B29C 64/20; B29C 64/153;
(Continued)

(56) References Cited

U.S. PATENT DOCUMENTS 4,144,808 A * 3/1979 Iwasa .................... B21C 51/005
101/41
4,265,175 A * 5/1981 Smejda ................... B41F 11/00
101/115
(Continued)

FOREIGN PATENT DOCUMENTS

WO   WO-2012143960 A1 * 10/2012  .......... B30B 11/027

OTHER PUBLICATIONS

Extended EP Search Report dated Jan. 25, 2017.
EP office action for EP15737705.2 dated May 21, 2021.

*Primary Examiner* — John A Hevey
(74) *Attorney, Agent, or Firm* — Getz Balich LLC

(57) ABSTRACT

A process is provided for additively manufacturing at least one part. The processing includes depositing a substantially uniform layer of material over at least a portion of a support surface using a belt that contacts the material. The process also includes solidifying at least a portion of the layer of material using a solidification device to form at least a portion of the part.

20 Claims, 13 Drawing Sheets

(51) Int. Cl.
  *B29C 64/153* (2017.01)
  *B29C 64/218* (2017.01)
  *B29C 64/245* (2017.01)
  *B22F 3/16* (2006.01)
  *C22C 1/04* (2006.01)
  *B22F 10/10* (2021.01)
  *B22F 5/04* (2006.01)

(52) U.S. Cl.
  CPC ........ *B28B 13/0295* (2013.01); *B29C 64/153* (2017.08); *B29C 64/218* (2017.08); *B29C 64/245* (2017.08); *B33Y 10/00* (2014.12); *B33Y 30/00* (2014.12); *B22F 10/10* (2021.01); *C22C 1/0416* (2013.01); *C22C 1/0433* (2013.01); *C22C 1/0458* (2013.01); *Y02P 10/25* (2015.11)

(58) Field of Classification Search
  CPC ..... B33Y 10/00; B33Y 30/00; B28B 13/0295; B28B 1/001; Y02P 10/295; C22C 1/0458; C22C 1/0433; C22C 1/0416
  See application file for complete search history.

(56) References Cited

U.S. PATENT DOCUMENTS

| | | | |
|---|---|---|---|
| 5,637,175 A * | 6/1997 | Feygin | B22F 3/1055 156/264 |
| 6,066,285 A * | 5/2000 | Kumar | G03G 15/224 264/439 |
| 7,045,738 B1 | 5/2006 | Kovacevic et al. | |
| 7,777,155 B2 | 8/2010 | Twelves, Jr. et al. | |
| 7,789,037 B2 | 9/2010 | Teulet | |
| 8,383,985 B2 | 2/2013 | Twelves, Jr. et al. | |
| 8,460,755 B2 | 6/2013 | Rodgers | |
| 8,488,994 B2 | 7/2013 | Hanson et al. | |
| 2002/0152002 A1 | 10/2002 | Lindemann et al. | |
| 2005/0263934 A1* | 12/2005 | Chung | B29C 64/153 264/113 |
| 2009/0050449 A1* | 2/2009 | Boele | B65G 17/08 198/735.2 |
| 2009/0169664 A1 | 7/2009 | Cox | |
| 2009/0200275 A1 | 8/2009 | Twelves, Jr. et al. | |
| 2011/0287185 A1 | 11/2011 | Felstead et al. | |
| 2012/0164322 A1* | 6/2012 | Teulet | B22F 3/1055 118/103 |
| 2012/0228807 A1 | 9/2012 | Teulet | |
| 2013/0071562 A1 | 3/2013 | Szuromi et al. | |
| 2013/0078013 A1* | 3/2013 | Chillscyzn | G03G 15/169 399/307 |
| 2013/0277891 A1 | 10/2013 | Teulet | |
| 2014/0141961 A1* | 5/2014 | Koszo | B28B 3/02 501/155 |
| 2014/0363585 A1 | 12/2014 | Pialot et al. | |
| 2015/0021406 A1* | 1/2015 | Mercier | E01B 27/102 239/1 |

* cited by examiner

SYSTEMS AND PROCESSES FOR DISTRIBUTING MATERIAL DURING ADDITIVE MANUFACTURING

CROSS-REFERENCE TO RELATED APPLICATIONS

This application claims priority to PCT Patent Application No. PCT/US2015/011145 filed Jan. 13, 2015, which claims priority to U.S. Provisional Application Ser. No. 61/927,286 filed Jan. 14, 2014, which are hereby incorporated herein by reference in their entireties.

BACKGROUND OF THE INVENTION

1. Technical Field

This disclosure relates generally to additive manufacturing and, more particularly, to material distribution during additive manufacturing.

2. Background Information

Various additive manufacturing systems are known in the art for forming one or more parts. The tem). "additive manufacturing" may describe a process where a part or parts are formed by accumulating and/or fusing material together, typically in a layer-on-layer manner Layers of powder material, for example, may be disposed and thereafter solidified (e.g., sintered or otherwise melted) sequentially onto one another to form the part(s).

During additive manufacturing, a layer of powder material may be disposed over a support surface using a blade coater. This blade coater includes a blade, which is elevated above the support surface or a previously deposited layer of powder material on the support surface. A quantity of the powder material is deposited in front of the blade, which pushes the powder material across the support surface to provide the layer of the powder material. With such a configuration, however, the blade is susceptible to hanging up on an edge or edges of previously solidified melted material where, for example, the volume of the solidified material is greater than expected. Such a hang up may damage the blade.

There is a need in the art for improved additive manufacturing material coating device.

SUMMARY OF THE DISCLOSURE

According to an aspect of the invention, a system is provided for manufacturing at least one part. This system includes a coating device, a solidification device and a support, which includes a support surface. The coating device includes a plurality of exterior surfaces disposed around an axis. The coating device is adapted to deposit a layer of powder over at least a portion of the support surface using one or more of the exterior surfaces as the exterior surfaces revolve around the axis. The solidification device is adapted to solidify at least a portion of the layer of powder to form at least a portion of the part.

According to another aspect of the invention, another system is provided for manufacturing at least one part. This system includes a coating device, a solidification device and a support, which includes a support surface. The coating device includes a belt wrapped around a plurality of rollers. The coating device is adapted to deposit a layer of material over at least a portion of the support surface by pushing the material across at least the portion of the support surface with the belt. The solidification device is adapted to solidify at least a portion of the layer of material to faint at least a portion of the part.

According to still another aspect of the invention, a process is provided for manufacturing at least one part. This process includes depositing a substantially uniform layer of material over at least a portion of a support surface using a belt that contacts the material. The process also includes solidifying at least a portion of the layer of material using a solidification device to form at least a portion of the part.

The coating device may be adapted to compact the material over the support surface using the belt.

The belt may include a plurality of interconnected links.

The coating device may be adapted to deposit the layer of powder by pushing the powder across at least the portion of the support surface with one or more of the exterior surfaces.

The coating device may be adapted to compact the powder over the support surface using one or more of the exterior surfaces.

The coating device may include a belt configured with a plurality of interconnected links. Each of the links may include a respective one of the exterior surfaces.

The coating device may include a plurality of rollers. A first of the rollers may be rotatable about the axis. The belt may circumscribe the rollers. The belt may be engaged with one or more of the rollers.

The coating device may include a carriage adapted to move the belt at least partially across the support surface. The rollers may be attached to the carriage.

The carriage may be adapted to move the belt reciprocally at least partially across the support surface.

The carriage may be adapted to move the belt along looped trajectory.

The coating device may be adapted to change a distance between the belt and the support surface.

The system may also include a cleaning device adapted to remove powder from one or more of the exterior surfaces.

One of the exterior surfaces may have a lateral width that is substantially equal to or greater than a lateral width of the support surface.

One of the exterior surfaces may be substantially planar.

The solidification device may include a laser and/or an electron beam energy source.

The depositing may include pushing the material across at least the portion of the support surface with the belt.

The process may include compacting the material over at least the portion of the support surface using the belt.

The material may be or include powder.

The foregoing features and the operation of the invention will become more apparent in light of the following description and the accompanying drawings.

DETAILED DESCRIPTION OF THE INVENTION

Figure 1:
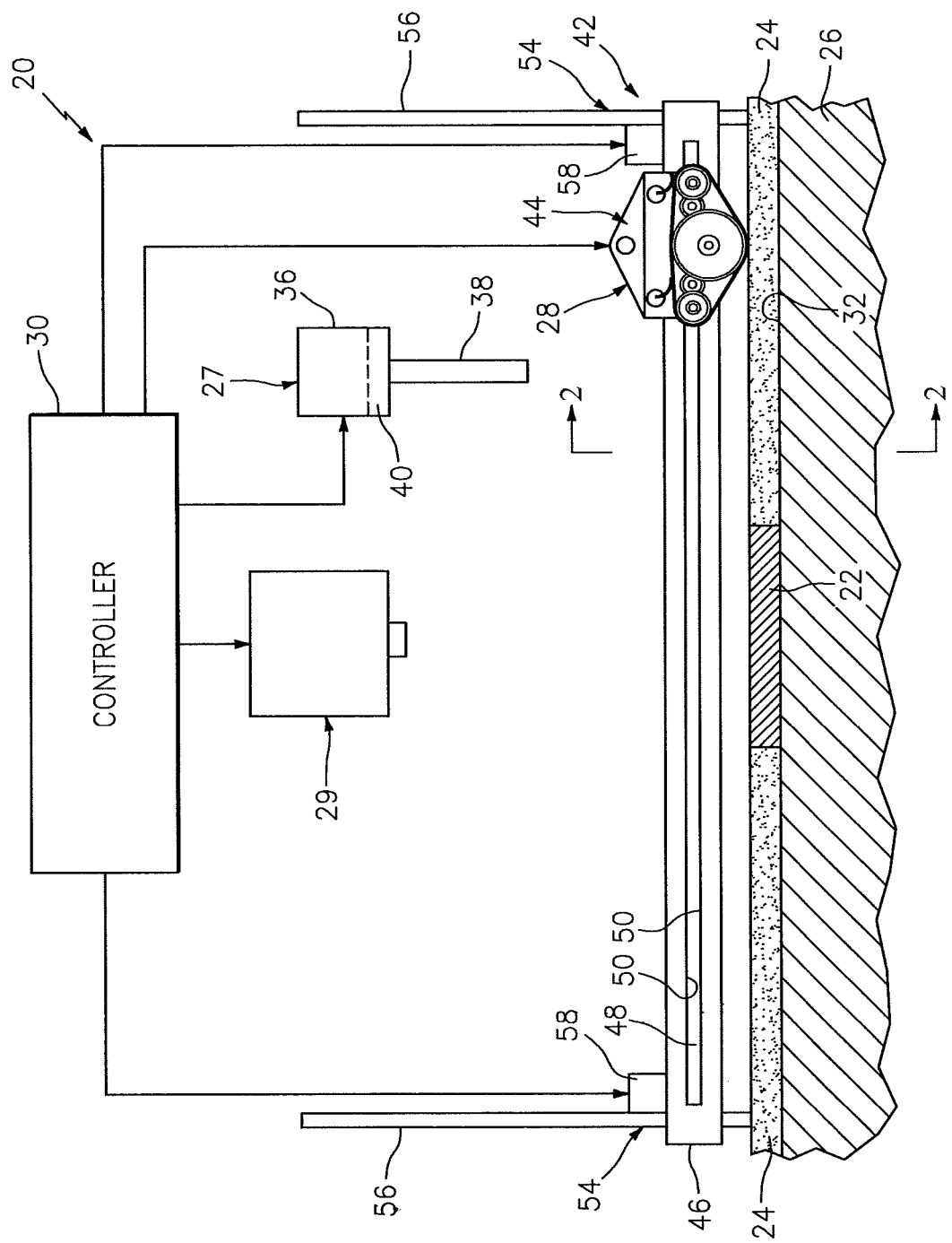
FIG. 1 is a sectional illustration of an additive manufacturing system.
Figure 2:
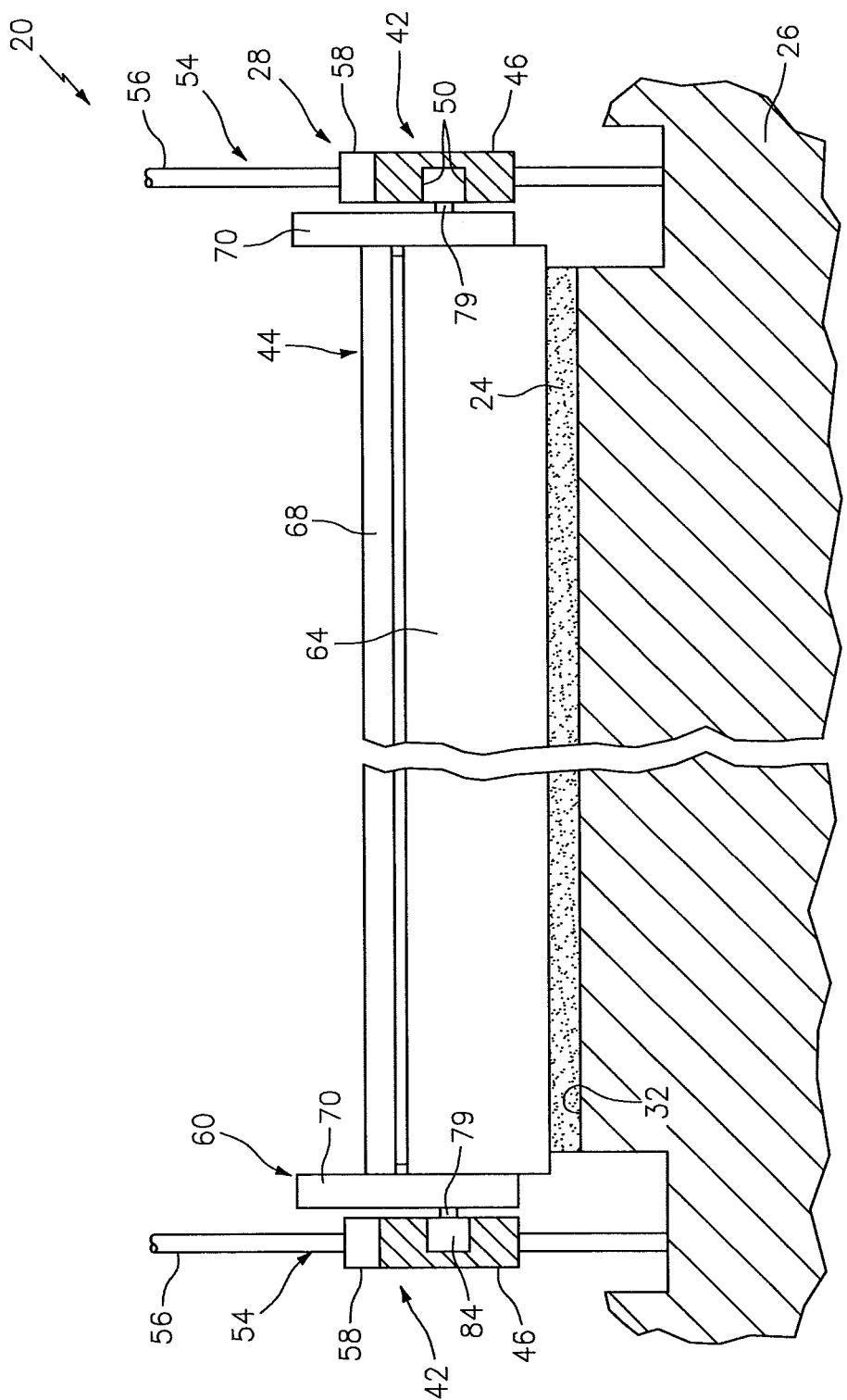
FIG. 2 is a cross sectional illustration of the additive manufacturing system of FIG. 1.

FIGS. 1 and 2 illustrate a system 20 for additively manufacturing a part 22 or parts from material 24 such as, for example, ceramic powder and/or metal powder. Examples of ceramic powder include oxides, nitrides, carbides, oxynitrides, carbonitrides, lanthanides, and mixtures thereof such as Si3N4, Al2O3, SiC, AlN, $Si_3N_4$—$Y_2O_3$—AlN, 3Y-TZP (yttria-doped polycrystalline tetragonal zirconia), YAG (yttrium aluminum garnet), TiO2, ZrO2, SiO2, zircon $ZrSiO_4$, and ceria $CeO_2$, etc. Examples of metal powder include materials commonly used for aerospace application such as Al (Al 2024, Al 6061, Al7075), Ti (Ti6Al-4V), Ni (In 625, In 718, In 100, Hastelloy X, B1900+Hf, Mar-M-247), and Co-based superalloys (CoCr, Stellites, Co—Al—W, Mar-M-509). The system 20, of course, may also or alternatively additively manufacture part(s) 22 from one or more types and/or forms of material other than those described above.

The additive manufacturing system 20 includes a support 26, a material source 27, a coating device 28 and a solidification device 29. The system 20 also includes a controller 30, which is in signal communication (e.g., hardwired and/or wirelessly coupled) with one or more of the system components 27-29.

The support 26 may be configured as or within an enclosed housing (e.g., sealed enclosure) in which at least a portion of one or more of the system components 27-30 may be located. The support 26 includes a support surface 32. This support surface 32 is configured to support the material 24 and/or at least a portion of the part 22 during additive manufacturing. The support surface 32, for example, may be substantially horizontal relative to gravity. The support surface 32 may also have a generally planar geometry.

Figure 3:
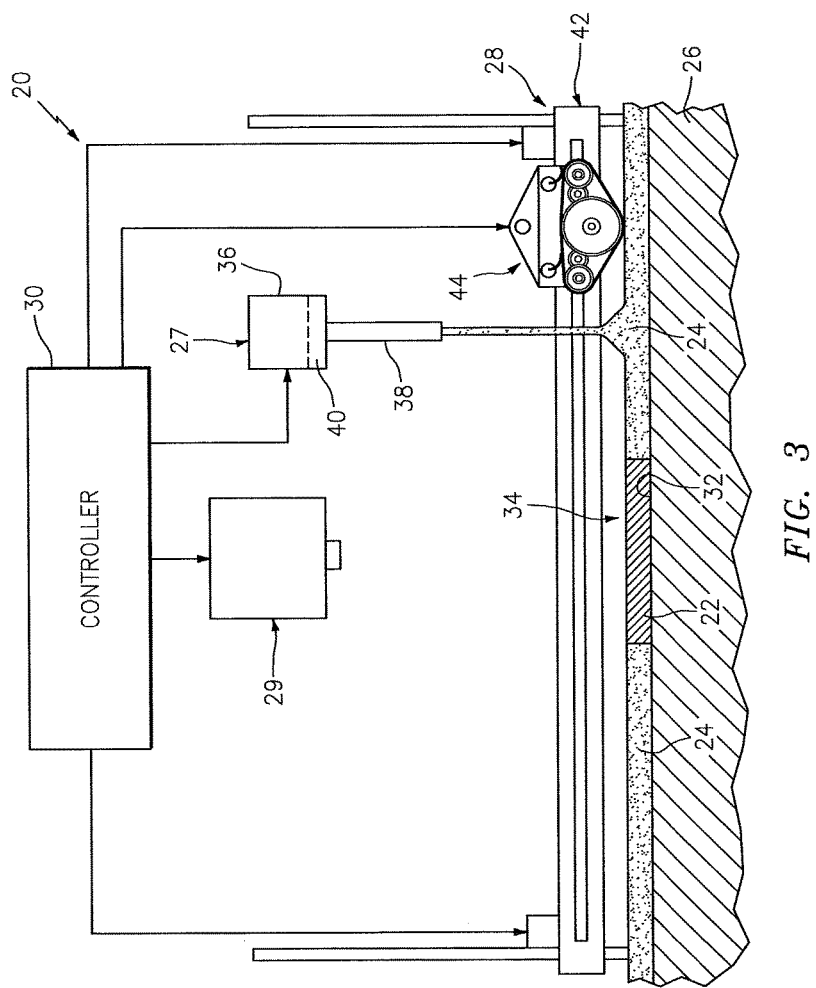
FIG. 3 is another sectional illustration of the additive manufacturing system of FIG. 1.

Referring to FIG. 3, the material source 27 is adapted to deposit a quantity of the material 24 onto the support surface 32 longitudinally between a location 34 where the part 22 is to be formed and a coater of the coating device 28. The material source 27 may include a material reservoir 36 (e.g., a hopper) and a material outlet 38 (e.g., conduit), which directs the material 24 from the reservoir 36 onto the support surface 32. The outlet 38 may be spatially fixed. Alternatively, the outlet 38 may be adapted to move in order to deposit the material 24 at various locations on the support surface 32.

The material source 27 may also include a material regulator 40 configured with, for example, the reservoir 36. The material regulator 40 is adapted to control the quantity and/or the flow rate of the material 24 being directed onto the support surface 32. The material regulator 40 may be configured as or otherwise include a valve and/or a pump (e.g., a hopper screw).

Figure 4:
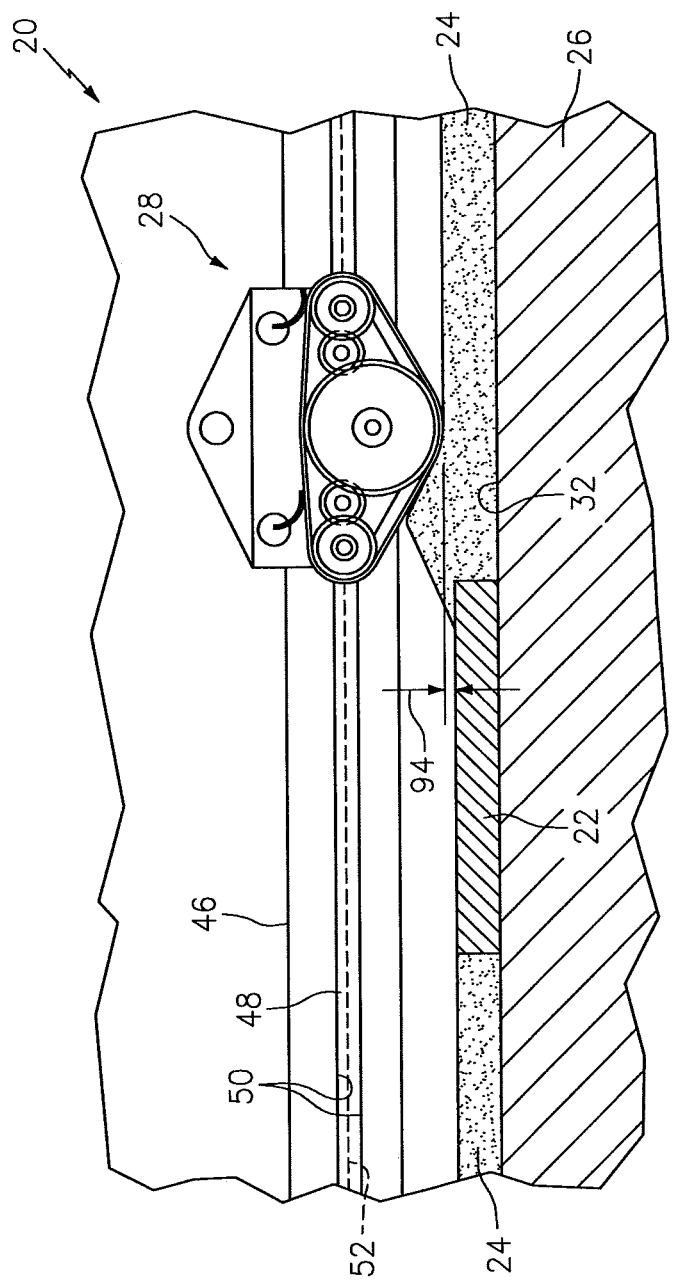
FIGS. 4-6 are sectional illustrations of a portion of the additive manufacturing system of FIG. 1.
Figure 5:
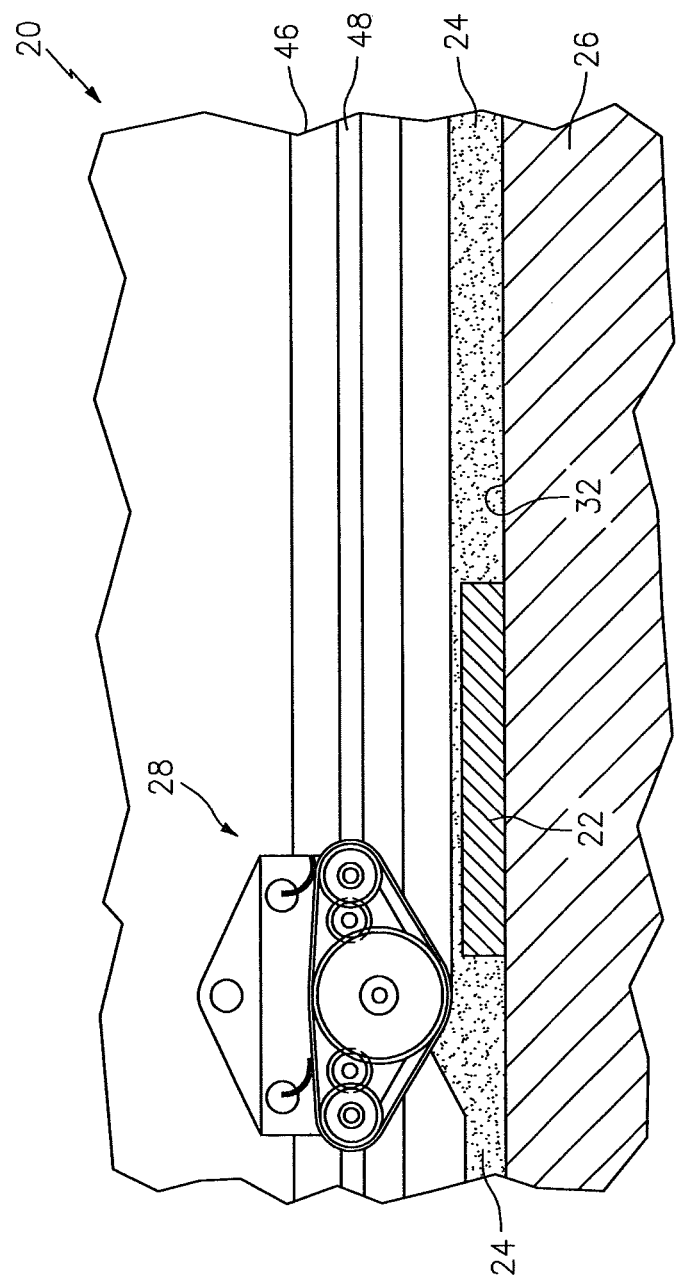
Figure 6:
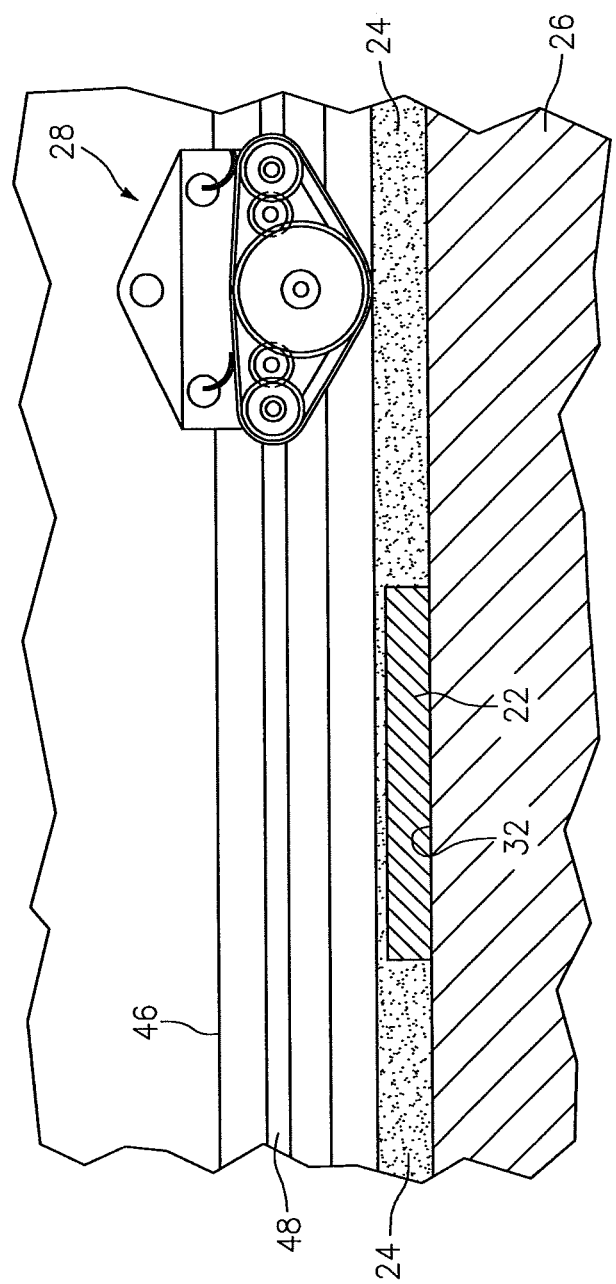

Referring to FIGS. 4-6, the coating device 28 is adapted to move (e.g., push) the material 24 deposited by the material source 27 (see FIG. 3) across at least a portion of the support surface 32 to provide a (e.g., substantially uniform) layer of the material 24 over at least a portion of the support surface 32. The coating device 28 may also be adapted to substantially contemporaneously and/or subsequently compact the material 24 within the deposited layer.

Referring to FIGS. 1 and 2, the coating device 28 includes a base 42 and a coater 44. The base 42 includes one or more beams 46. Each of these beams 46 includes a slot 48, which may extend vertically between toothed sidewalls 50. The slot 48 extends laterally into the respective beam 46 from a beam side surface. The slot 48 extends longitudinally within (or into or through) the respective beam 46 along a centerline 52 (e.g., an axis), which may be straight and/or substantially parallel to the support surface 32 (see FIG. 4).

The base 42 also includes one or more lifts 54. Each of the lifts 54 is configured with a respective one of the beams 46. Each lift 54 includes one or more tracks 56 (or stanchions) and one or more actuators 58. The tracks 56 may be connected to and extend vertically from the support 26. The tracks 56 may be respectively located at longitudinal ends of the beam 46, which is slidably mated with the tracks 56. The actuators 58 are connected to the beam 46 and respectively engaged with the tracks 56. The actuators 58 are adapted to move the beam 46 vertically up and down along the tracks 56. Each actuator 58, for example, may include an electric motor that drives a gear (or friction wheel), which is meshed with teeth of a respective one of the tracks 56.

Figure 7:
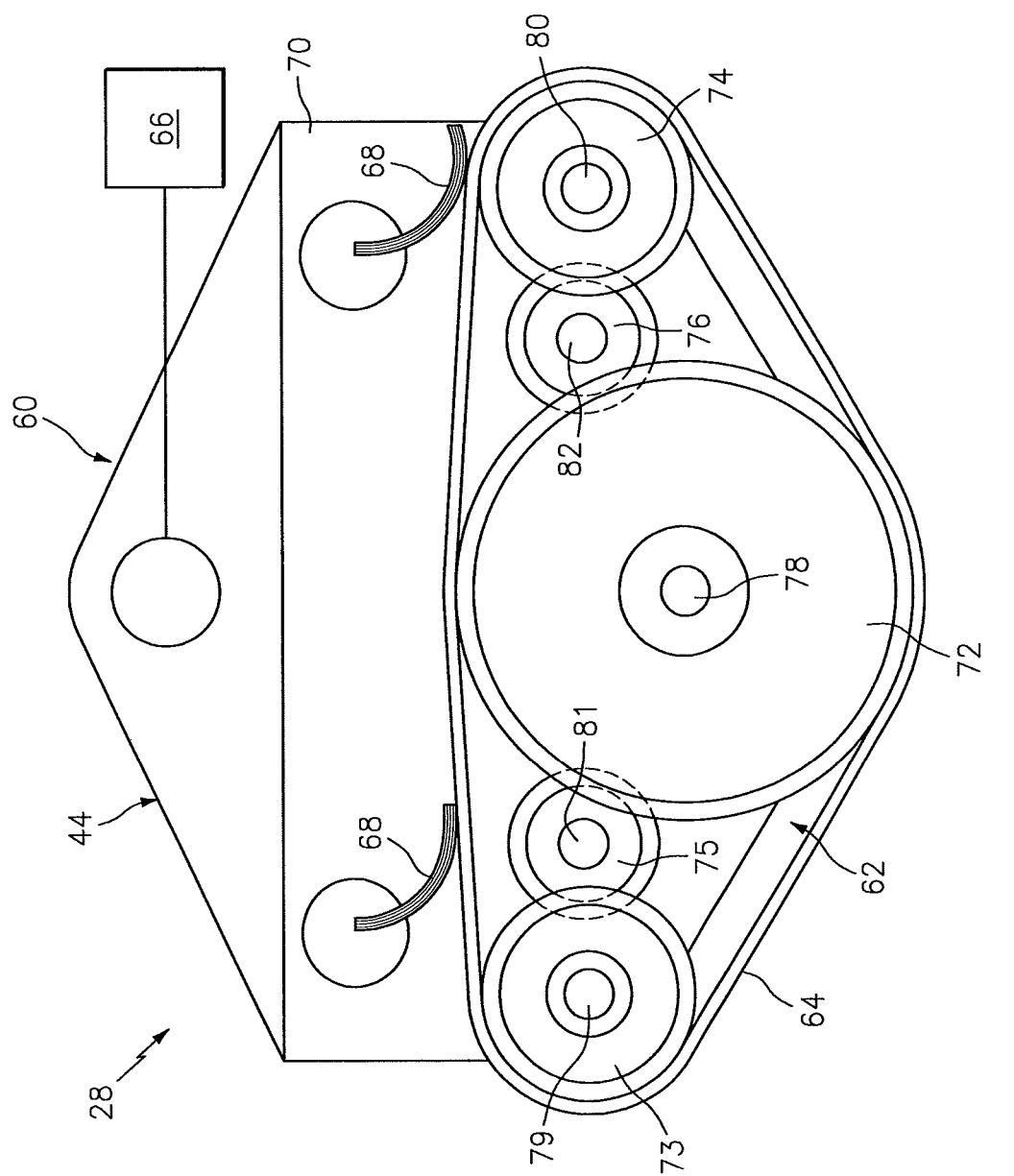
FIG. 7 is a sectional illustration of a coater included in the additive manufacturing system of FIG. 1.

Referring to FIGS. 2 and 7, the coater 44 includes a carriage 60, a drivetrain 62, a belt 64 and one or more actuators 66. The coater 44 may also include one or more cleaning devices 68.

The carriage 60 may include one or more sub-carriages 70. Each of these sub-carriages 70 may be configured as a vertically and longitudinally extending plate.

The drivetrain 62 includes one or more rollers 72-76 and one or more axles 78-82, which rotatably attach the rollers 72-76 to one or more of the sub-carriages 70. The roller 72 (e.g., a level setting roller) is arranged longitudinally between the rollers 73 and 74 (e.g., drive rollers) as well as longitudinally between the rollers 75 and 76 (e.g., idler rollers). Each of the rollers 75 and 76 is arranged and engaged (e.g., meshed) longitudinally between the roller 72 and a respective one of the rollers 73 and 74.

A vertical distance between the roller 72 and the support surface 32 is less than respective vertical distances between the rollers 73-76 and the support surface 32. A diameter of the roller 72 may be greater than respective diameters of the rollers 73-76. The diameter of the rollers 73 and 74 may be greater than respective diameters of the rollers 75 and 76. The drivetrain 62, however, is not limited to the foregoing roller dimensions. In other embodiments, for example, the diameters of the rollers 73 and 74 may be substantially equal to or greater than the diameter of the roller 72.

Figure 8:
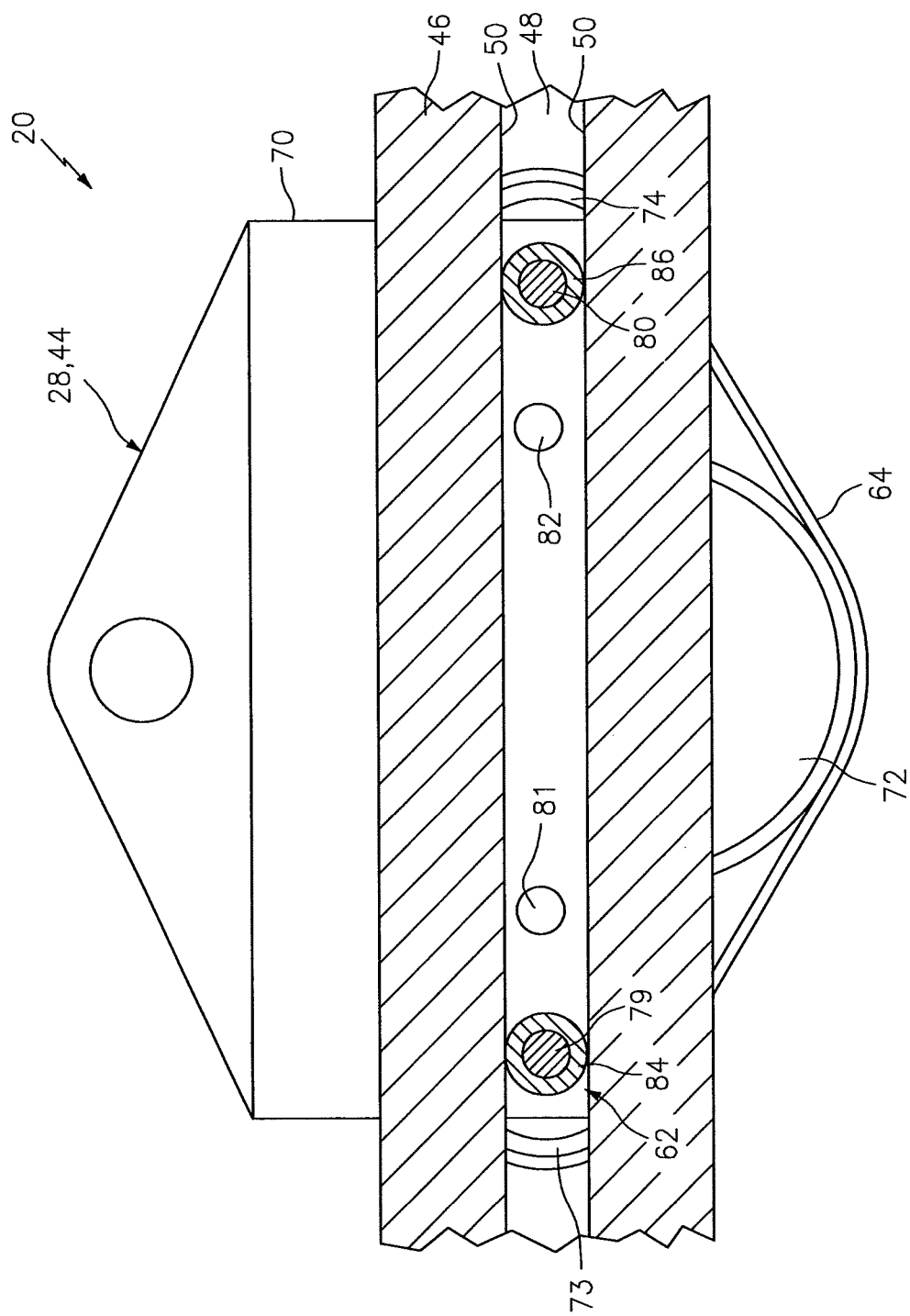
FIG. 8 is a sectional illustration of a portion of the additive manufacturing system of FIG. 1.

The drivetrain 62 of FIGS. 2 and 8 also include one or more gears 84 and 86. The gears 84 are connected to the roller 73 through the axle 79. The gears 86 are connected to the roller 74 through the axle 80. Each of the gears 84 and 86 is disposed within a respective one of the slots 48. Each of the gears 84 and 86 is meshed with one or more of the toothed sidewalls 50. With this configuration, movement of the carriage 60 along the centerline 52 (see FIG. 4) rotates the gears 84 and 86, which directly or indirectly rotate the rollers 72-76 and, thus, the belt 64 as described below in further detail.

Figure 9:
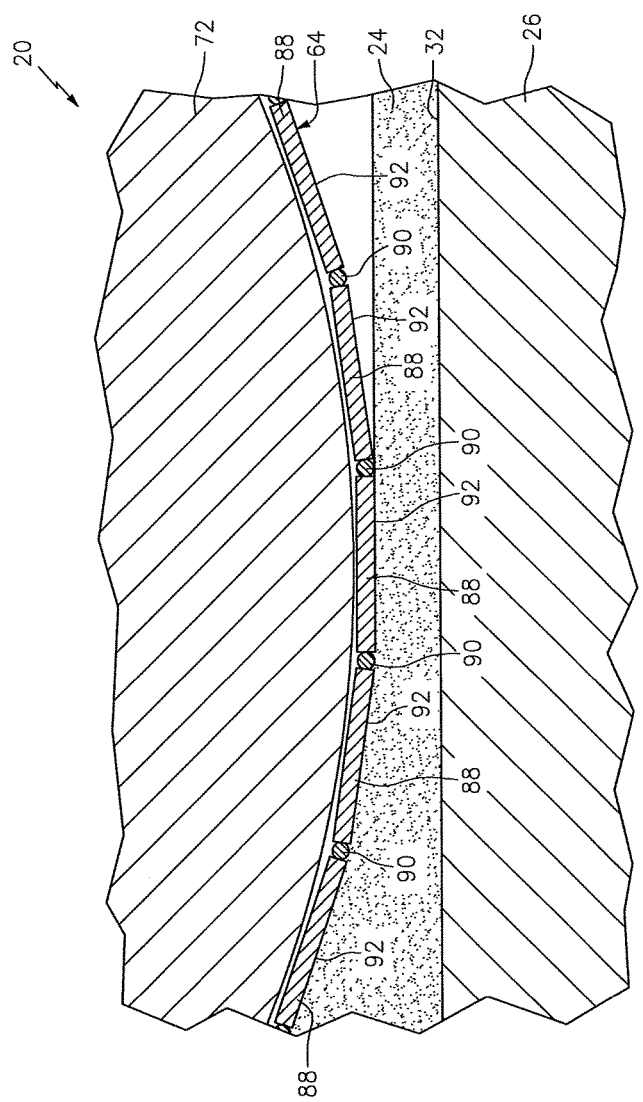
FIG. 9 is a sectional illustration of a portion of the additive manufacturing system of FIG. 1.

Referring to FIG. 9, the belt 64 may include a plurality of interconnected links 88. Adjacent links 88 may be connected to one another through a pivot (e.g., a pin) connection 90. Each of the links 88 includes an exterior surface 92, which may be a substantially flat planar surface. However, the exterior surface 92 of one or more of the links 88 may alternatively be non-planar; e.g., curved.

Referring to FIGS. 7 and 9, the belt 64 and its interconnected links 88 circumscribe the rollers 72-76. The belt 64 is engaged with the rollers 72-74 through, for example, frictional contact and/or meshed features (e.g., teeth or cogs). With this configuration, rotation of the rollers 72-76 rotates the belt 64 and causes the surfaces 92 to generally revolve around the rollers 72-76 and, thus, their axes.

Referring to FIG. 7, each actuator 66 is adapted to move the coater 44 along the beams 46 (see FIG. 1). Each actuator 66, for example, is connected to a respective one of the sub-carriages 70 through at least one linkage; e.g., a strut or pulley system. Each actuator 66 may also be grounded; e.g., connected to the beam 46. Each actuator 66 may be configured as a motor that pushes and/or pulls the linkage to move the sub-carriage 70 and, thus, the carriage 60 and the coater 44. Alternatively, each actuator 66 may be configured to directly drive the drivetrain 62.

The cleaning devices 68 extend laterally between and are attached to one or more of the sub-carriages 70 (see also FIG. 2). These cleaning devices 68 are adapted to remove material 24 from the belt 64. Each cleaning device 68, for example, may be configured with a flexible wiper blade, which brushes material 24 off of the belt 64 and its interconnected links 88.

Figure 10:
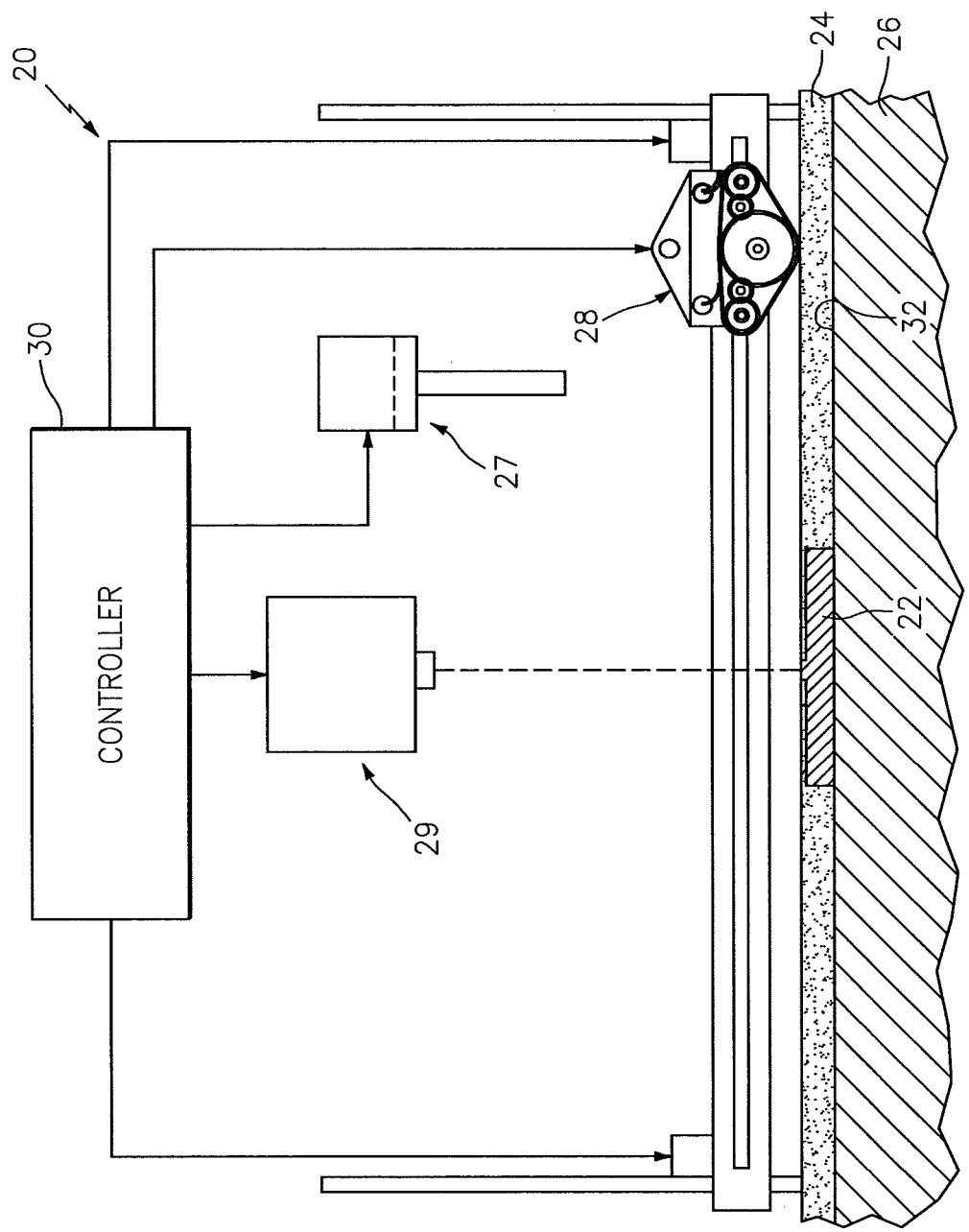
FIG. 10 is another sectional illustration of the additive manufacturing system of FIG. 1.

Referring to FIG. 10, the solidification device 29 is adapted to solidify at least a portion of the material 24 deposited on the support surface 32 to form at least a portion of the part 22. For example, where the material 24 is metal powder, the solidification device 29 may melt at least some of the metal powder such that the melted powder fuses together to form a portion of the part 22. The solidification device 29 may be configured as or otherwise include a laser and/or an electron beam energy source.

The controller 30 is adapted to signal one or more of the system components 27-29 to perform at least a portion of the process described below. The controller 30 may be implemented with a combination of hardware and software. The hardware includes memory and a processing device (or system), which includes one or more single-core and/or multi-core processors. The memory may be a non-transitory computer readable medium, and configured to store software (e.g., program instructions) for execution by the processing device. The hardware may also or alternatively include analog and/or digital circuitry other than that described above.

Figure 11:
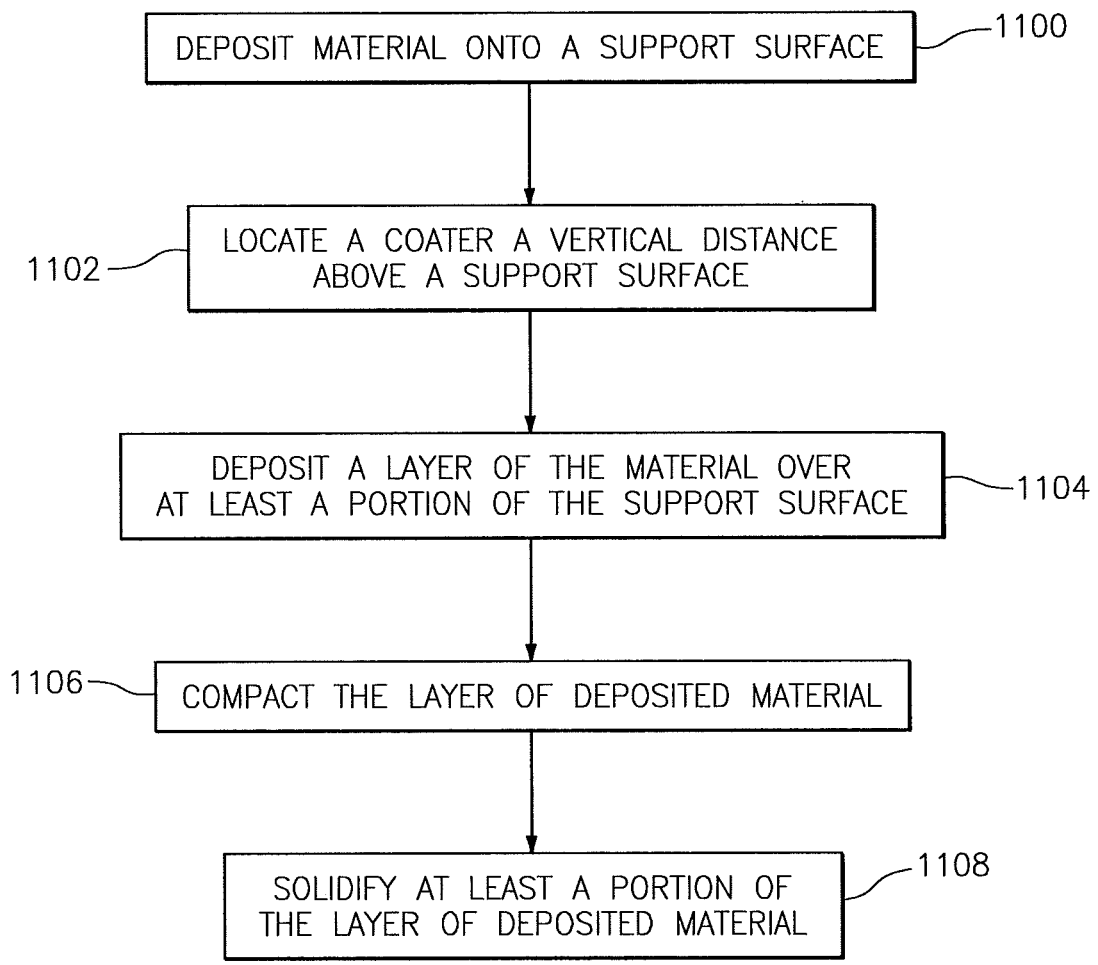
FIG. 11 is a flow diagram of a process for additively manufacturing a part or parts using the additive manufacturing system of FIG. 1.

FIG. 11 is a flow diagram of a process for additively manufacturing a part 22 (or parts) using the system 20. An example of a part that may be additive manufactured with the system 20 is a rotor blade for a turbine engine; e.g., a turbine blade, a compressor blade or a fan blade. Other examples of a part that may be additive manufactured with the system 20 include a stator blade for a turbine engine, a guide vane for a turbine engine, a gas path wall for a turbine engine as well as various other components included in a turbine engine. The process of FIG. 11 and the system 20, of course, may also or alternatively additive manufacture parts other than those included in a turbine engine.

In step 1100, referring to FIG. 3, the material source 27 deposits a mound of the material 24 onto the support surface 32. The controller 30, for example, may signal the material regulator 40 to direct a predetermined quantity of the material 24 from the reservoir 36, through the outlet 38 and onto the support surface 32. The mound of material 24 may extend partially or fully along a lateral length of the belt 64 and/or the support surface 32. Alternatively, the material source 27 may deposit a plurality of discrete mounds laterally across at least a portion of the support surface 32.

In step 1102, referring to FIG. 4, the coater 44 is located a non-zero vertical distance 94 above the support surface 32 and/or previously deposited material 24. The controller 30, for example, may signal the actuators 58 (see FIGS. 1 and 2) to vertically move the beams 46 to vertically locate the coater 44. The vertical distance 94 sets a vertical thickness of the layer of material 24 to be deposited over the support surface 32.

In step 1104, referring to FIGS. 4-6, the coating device 28 deposits a layer of the material 24 over at least a portion of the support surface 32. The controller 30, for example, may signal the actuators 66 (see FIGS. 1 and 7) to move the carriage 60 longitudinally along the beams 46 in a forward direction; e.g., towards the left-hand-side of FIGS. 4 and 5. This longitudinal carriage 60 movement causes a forward (e.g., right hand) portion of the belt 64 to push a quantity of the material 24 across the support surface 32. Simultaneously, another metered quantity of the material 24 passes vertically beneath the belt 64 thereby distributing the material 24 across the support surface 32.

Referring to FIGS. 4 and 7-9, the longitudinal carriage 60 movement also rotates the gears 84 and 86, which rotate the rollers 72-76 and the belt 64. In this manner, at least some of the exterior surfaces 92 may each at least partially compact the material 24 against the support surface 32 (or a previously deposited layer) and thereby provide a layer of the material 24 behind (e.g., toward the right of) the coating device 28. This layer may be substantially uniform where, for example, the vertical distance 94 (see FIG. 4) is substantially constant across a respective portion of the support 26; e.g., the centerline 52 is parallel to the support surface 32.

The gears 84 and 86 and the rollers 72-76 may be sized such that the link 88 (or links) vertically closest to the support surface 32 (see FIG. 9) is substantially longitudinally stationary during longitudinal carriage 60 movement. This configuration may reduce the likelihood of the material 24 being kicked up behind (e.g., toward the right of) the coater 44. This configuration may also reduce the likelihood of the belt 64 hanging up on or otherwise getting stuck against previously solidified material. For example, rather than catching against the solidified material, the belt 64 may rollover the solidified material. The coater 44 may also include a suspension, which provides a relatively small degree of vertical movement for the axle and roller to reduce the likelihood of the solidified material damaging the belt 64 and/or other coating device 28 components.

In step 1106, referring to FIGS. 5, 6 and 9, the coating device 28 may compact (or further compact) the deposited material 24. The controller 30, for example, may signal the actuators 66 (see FIGS. 1 and 7) to move the carriage 60 longitudinally along the beams 46 in a reverse direction; e.g., towards the right-hand-side of FIGS. 5 and 6. In this manner, at least some of the exterior surfaces 92 may each further compact the material 24 against the support surface 32 (or a previously deposited layer) in a similar manner as described above. This additional pass (e.g., reciprocating movement) may also serve to compact any material that may have been kicked up behind the coater 44 during the step 1104.

In step 1108, referring to FIG. 10, at least a portion of the deposited layer of the material 24 is solidified. The controller 30, for example, may signal the solidification device 29 to selectively sinter or otherwise melt the material 24 to form at least a portion of the part 22.

One or more of the foregoing steps may be repeated for one or more iterations to additively manufacture the part 22 (or parts) layer-by-layer.

One or more of the process steps of FIG. 11 may be omitted, re-arranged and/or combined. For example, in some embodiments, the step 1102 may be omitted where the coater 44 is already located the vertical distance 94 from the support surface 32 and/or previously deposited material 24. In some embodiments, the steps 1100 and 1102 may be performed substantially contemporaneously. In some embodiments, the step 1106 may be omitted where the material 24 is sufficiently compacted during the step 1104.

The process of FIG. 11 may include one or more additional steps other than those described above. For example, in some embodiments, the part 22 (or parts) may undergo additional manufacturing processes after the material buildup. Examples of such additional manufacturing processes may include, but are not limited to, machining, surface finishing, coating, etc.

Figure 12:
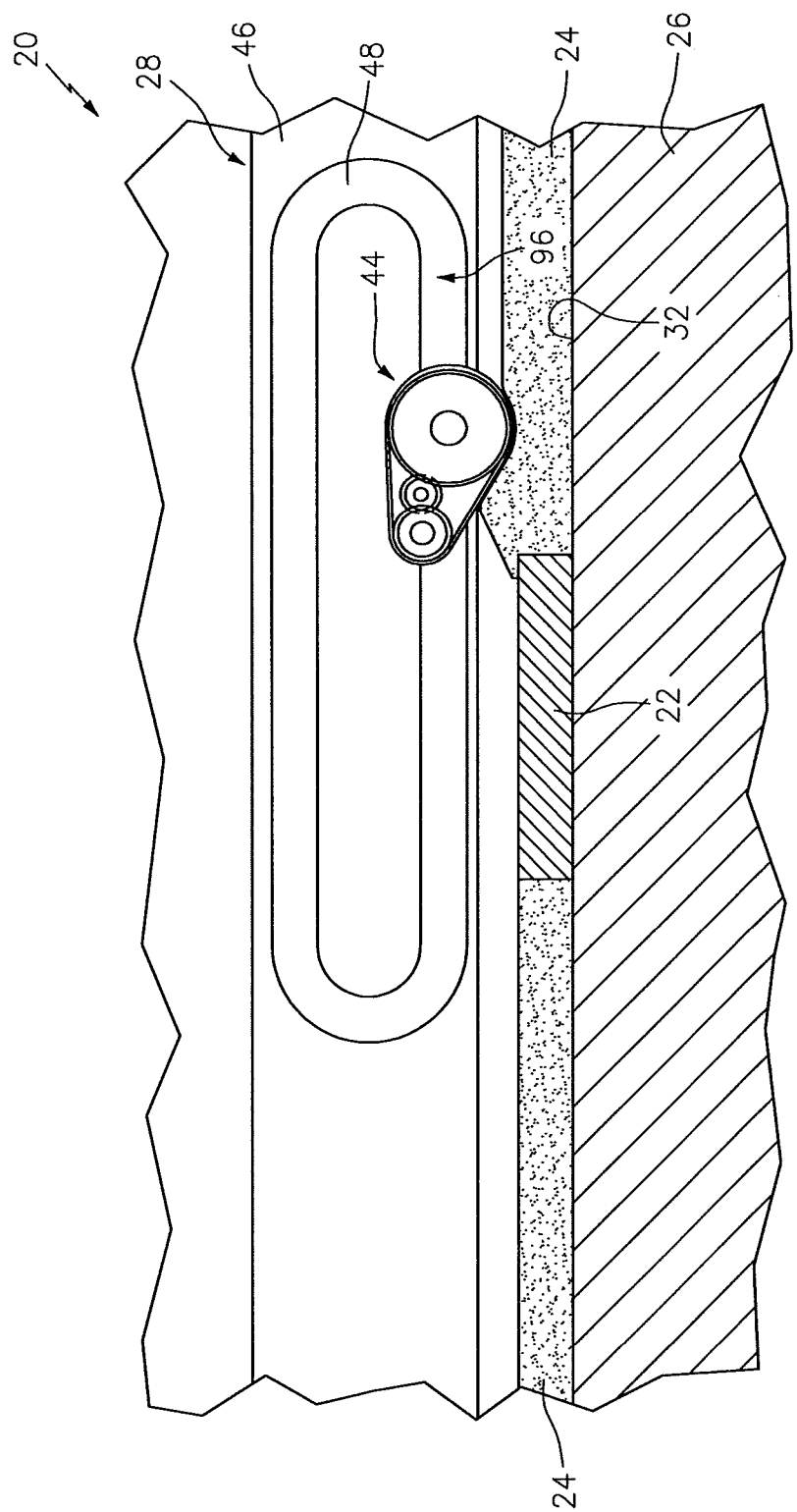
FIG. 12 is a sectional illustration of an alternate embodiment additive manufacturing system.
Figure 13:
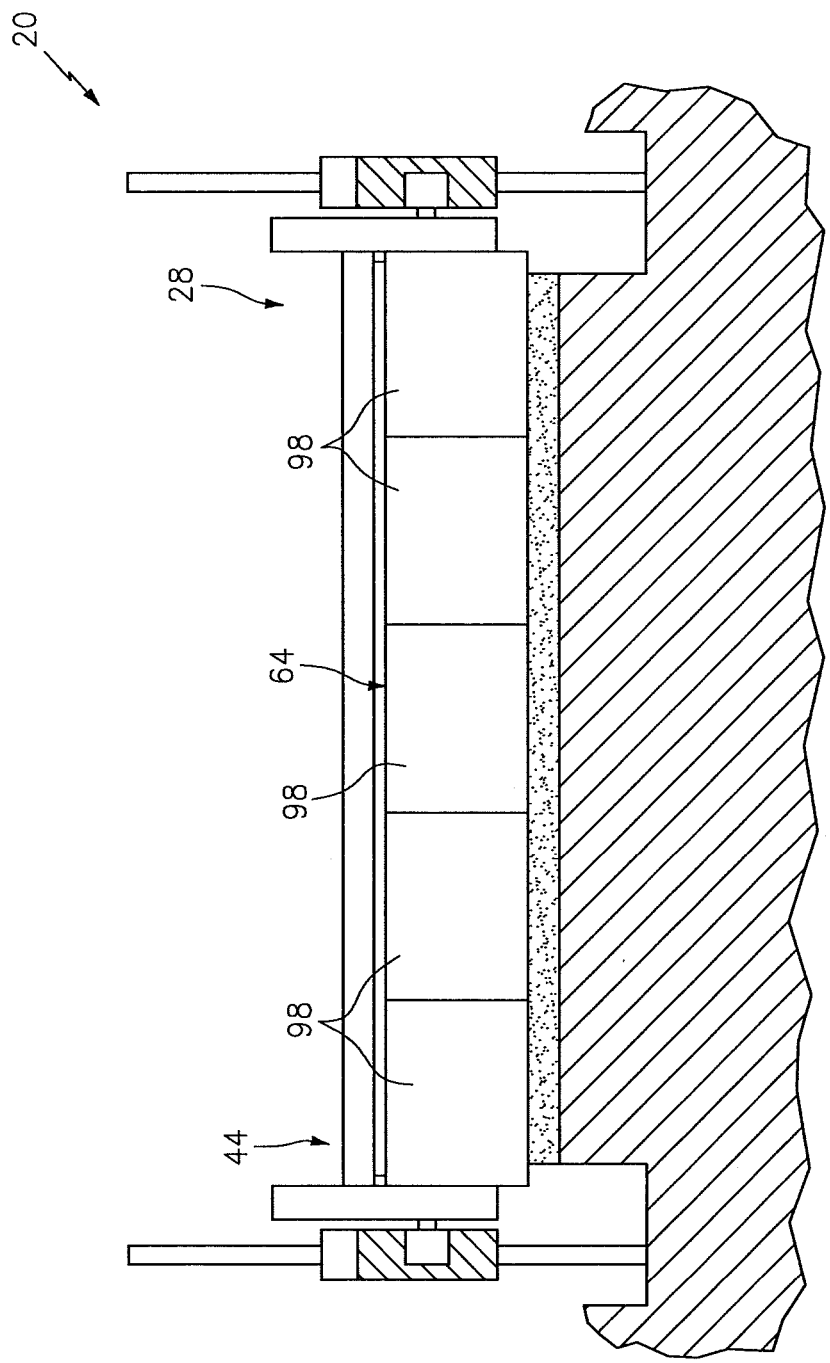
FIG. 13 is a cross sectional illustration of an alternate embodiment additive manufacturing system.

The coating device 28 may have various configurations other than that described above. For example, in the embodiment of FIG. 12, each slot 48 may be configured with a looped trajectory. In this manner, the coating device 28 may be lifted away from the material 24 while moving back to its starting position 96. In the embodiment of FIG. 13, the belt 64 is configured from a plurality of belts 98 or belt segments, which are arranged side-by-side to one another. In some embodiments, each actuator 58 may be configured as a piston or a pulley system. In some embodiments, one or more of the lifts 54 may each be configured as or include a screw (e.g., a threaded rod) that turns about an axis to lift and/or lower the respective sub-carriage 70. In some embodiments, the belt 64 may be a substantially continuous belt; e.g., without the interconnected links 88. The present invention therefore is not limited to any particular coating device 28 components configurations.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A system for manufacturing a part, the system comprising:
   a support including a support surface;
   a coating device comprising a coater, the coater including a carriage and a plurality of exterior surfaces disposed around an axis, the coating device adapted to deposit a layer of powder over at least a portion of the support surface using one or more of the exterior surfaces as the exterior surfaces revolve around the axis, the carriage adapted to move the coater back-and-forth along the support, and the carriage further adapted to move along a loop-shaped trajectory as the coater moves back-and-forth along the support; and
   a solidification device adapted to melt powder in at least a portion of the layer of powder such that the melted powder fuses together to form at least a portion of the part.

2. The system of claim 1, wherein the coating device is adapted to deposit the layer of powder by pushing the powder across at least the portion of the support surface with one or more of the exterior surfaces.

3. The system of claim 1, wherein the coating device is adapted to compact the powder over the support surface using one or more of the exterior surfaces.

4. The system of claim 1, wherein the coater includes a belt configured with a plurality of interconnected links, and each of the links includes a respective one of the exterior surfaces.

5. The system of claim 4, wherein
   the coater includes a plurality of rollers, a first of which is rotatable about the axis; and
   the belt circumscribes the rollers and is engaged with one or more of the rollers.

6. The system of claim 5, wherein the rollers are attached to the carriage.

7. The system of claim 4, wherein the coating device is adapted to change a distance between the belt and the support surface.

8. The system of claim 1, further comprising a cleaning device adapted to remove powder from one or more of the exterior surfaces.

9. The system of claim 1, wherein one of the exterior surfaces has a lateral width that is substantially equal to or greater than a lateral width of the support surface.

10. The system of claim 1, wherein the solidification device comprises a laser or an electron beam energy source.

11. A system for manufacturing a part, the system comprising:
    a support including a support surface;
    a coating device comprising a first beam, a second beam and a coater, the first beam comprising a first slot with a first toothed sidewall, the second beam comprising a second slot with a second toothed sidewall, the coater between the first beam and the second beam, the coater including a first gear, a second gear, a plurality of rollers and a belt wrapped around the rollers, the first gear meshed with the first toothed sidewall and adapted to move along a centerline of the first slot, the second gear meshed with the second toothed sidewall and adapted to move along a centerline of the second slot, the coating device adapted to deposit a layer of material over at least a portion of the support surface by pushing the material across at least the portion of the support surface with the belt; and
    a solidification device adapted to melt powder in at least a portion of the layer of material such that the melted powder fuses together to form at least a portion of the part.

12. The system of claim 11, wherein the coating device is adapted to compact the material over the support surface using the belt.

13. The system of claim 11, wherein the belt includes a plurality of interconnected links.

14. The system of claim 11, wherein the first slot and the second slot each have an annular geometry.

15. The system of claim 11, wherein
    the rollers includes a first roller, a second roller and a third roller that is arranged between and contacts the first roller and the second roller; and
    the belt contacts the first roller and the second roller.

16. The system of claim 15, wherein the belt does not contact the third roller.

17. The system of claim 15, wherein
a diameter of the first roller is greater than a diameter of the second roller; and
the diameter of the second roller is greater than a diameter of the third roller.

18. The system of claim 15, wherein
the belt contacts the first roller at a first contact patch and at a second contact patch; and
the second contact patch is diametrically opposed to and discrete from the first contact patch.

19. The system of claim 1, wherein
the coating device further comprises a first beam and a second beam;
the first beam comprises a loop-shaped first slot;
the second beam comprises a loop-shaped second slot;
the coater is between the first beam and the second beam; and
the coater comprises a drivetrain that is mated with and is adapted to move along the loop-shaped first slot and the loop-shaped second slot.

20. The system of claim 1, wherein
the coating device further comprises a first beam and a second beam;
the first beam comprises a first slot having a first toothed sidewall;
the second beam comprises a second slot having a second toothed sidewall;
the coater comprises a first gear and a second gear;
the first gear is within the first slot and is meshed with the first toothed sidewall; and
the second gear is within the second slot and is meshed with the second toothed sidewall.

\* \* \* \* \*